(12) United States Patent
Chen

(10) Patent No.: US 11,652,915 B2
(45) Date of Patent: May 16, 2023

(54) ELECTRONIC EQUIPMENT, CONTROL METHOD AND DEVICE THEREOF, AND READABLE STORAGE MEDIUM

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 394 days.

(21) Appl. No.: 16/814,907

(22) Filed: Mar. 10, 2020

(65) Prior Publication Data

US 2021/0160364 A1    May 27, 2021

(30) Foreign Application Priority Data

Nov. 27, 2019    (CN) .......................... 201911184534.3

(51) Int. Cl.
| | |
|---|---|
| *H04M 1/724* | (2021.01) |
| *H02P 25/032* | (2016.01) |
| *G06F 3/01* | (2006.01) |
| *H04M 19/04* | (2006.01) |
| *H02N 2/02* | (2006.01) |

(Continued)

(52) U.S. Cl.
CPC ............ *H04M 1/724* (2021.01); *G06F 3/016* (2013.01); *H02N 2/00* (2013.01); *H02N 2/02* (2013.01); *H02P 25/024* (2016.02); *H02P 25/032* (2016.02); *H02P 25/064* (2016.02); *H04M 19/04* (2013.01); *H04M 2250/22* (2013.01); *H04R 2499/11* (2013.01)

(58) Field of Classification Search
CPC .. H04M 1/724; H04M 19/04; H04M 2250/22; H02P 25/024; H02P 25/032; H02P 25/064; G06F 3/016; H02N 2/00; H02N 2/02; H04R 2499/11
See application file for complete search history.

(56) References Cited

U.S. PATENT DOCUMENTS

| | | |
|---|---|---|
| 9,148,716 B2 | 9/2015 | Liu |
| 9,591,391 B2 | 3/2017 | Liu |

(Continued)

FOREIGN PATENT DOCUMENTS

| | | |
|---|---|---|
| CN | 105549777 A | 5/2016 |
| CN | 106849781 A | 6/2017 |

(Continued)

OTHER PUBLICATIONS

Supplementary European Search Report in the European application No. 20164886.2, dated Jul. 29, 2020.

(Continued)

*Primary Examiner* — John J Lee
(74) *Attorney, Agent, or Firm* — Syncoda LLC; Feng Ma

(57) ABSTRACT

Electronic equipment includes a center frame, a first motor, a second motor, and a drive module. The first motor and the second motor are fixed respectively at a first designated location and a second designated location of the center frame. The drive module is electrically connected respectively to the first motor and the second motor. The drive module is adapted to drive, according to a control signal, the first motor or the second motor to vibrate independently, or drive the first motor and the second motor to vibrate synchronously.

19 Claims, 16 Drawing Sheets

A first set of voltages and a second set of voltages are acquired by acquiring detected voltages output by a magnetic field detector module by detection on the first motor and the second motor within a preset period of time — 1001

When an operation triggering a vibrational prompt is detected, a first resonant frequency of the first motor for the moment is acquired according to the first set of voltages, and a second resonant frequency of the second motor for the moment is acquired according to the second set of voltages — 1002

The first resonant frequency and the second resonant frequency are sent to the drive module. Accordingly, the drive module drives, respectively according to the first resonant frequency and the second resonant frequency, the first motor and the second motor to vibrate synchronously to implement the vibrational prompt — 1003

(51) Int. Cl.
  *H02N 2/00* (2006.01)
  *H02P 25/024* (2016.01)
  *H02P 25/064* (2016.01)

(56) References Cited

U.S. PATENT DOCUMENTS

| | | | |
|---|---|---|---|
| 10,152,129 B2 | 12/2018 | He | |
| 2009/0009118 A1* | 1/2009 | Takeuchi | H02P 6/16 318/400.38 |
| 2011/0157052 A1* | 6/2011 | Lee | G06F 1/1626 345/173 |
| 2012/0007538 A1 | 1/2012 | Takeuchi | |
| 2013/0182878 A1* | 7/2013 | Liu | H04R 1/021 381/333 |
| 2015/0289043 A1 | 10/2015 | Liu | |
| 2017/0160806 A1 | 6/2017 | He | |
| 2018/0026572 A1* | 1/2018 | Ge | H02P 25/032 318/135 |

FOREIGN PATENT DOCUMENTS

| | | |
|---|---|---|
| CN | 108347525 A | 7/2018 |
| CN | 108683761 A | 10/2018 |
| CN | 109756159 A | 5/2019 |
| CN | 208820835 U | 5/2019 |
| CN | 106254580 B | 6/2019 |
| CN | 109901703 A | 6/2019 |
| CN | 209313874 U | 8/2019 |
| CN | 110266856 A | 9/2019 |
| CN | 110312038 A | 10/2019 |
| EP | 2012422 A1 | 1/2009 |
| EP | 2339427 A2 | 6/2011 |
| JP | S63123476 A | 5/1988 |
| JP | H02265681 A | 10/1990 |
| JP | H09201079 A | 7/1997 |
| JP | 2001054259 A | 2/2001 |
| JP | 2001121079 A | 5/2001 |
| JP | 2004267936 A | 9/2004 |
| JP | 2011152533 A | 8/2011 |
| JP | 2013050920 A | 3/2013 |
| JP | 2019130462 A | 8/2019 |
| KR | 20110074333 A | 6/2011 |
| KR | 20170081727 A | 7/2017 |
| KR | 20190100832 A | 8/2019 |

OTHER PUBLICATIONS

Choi, Dong-Soo; "Haptic Rendering Method using Beat Phenomenon a Transparent Film-type Actuator Array", Korea University of Technology Education, Feb. 2015.

International Search Report in the international application No. PCT/CN2020/074179, dated Aug. 27, 2020.

First Office Action after Appeal of the Korean application No. 10-2020-7007403, dated Dec. 30, 2021.

First Office Action of the Japanese application No. 2020-515683, dated Feb. 22, 2022.

First Office Action of the Chinese application No. 201911184534.3, dated Jul. 26, 2022.

Office Action ofthe Indian application No. 202047012839, dated Oct. 11, 2022.

* cited by examiner

ELECTRONIC EQUIPMENT, CONTROL METHOD AND DEVICE THEREOF, AND READABLE STORAGE MEDIUM

CROSS-REFERENCE TO RELATED APPLICATION

This application claims priority to Chinese Application No. 201911184534.3 filed on Nov. 27, 2019, the disclosure of which is hereby incorporated by reference in its entirety.

BACKGROUND

At present, when using electronic equipment, a user may perform an operation such as a touch, a slide, a voice operation, etc. After the operation is completed, a motor in the electronic equipment may vibrate according to a control signal, thereby giving a feedback to the operation. The feedback is a so-called vibrational prompt.

SUMMARY

In view of this, embodiments herein provide electronic equipment, a control method and device thereof, and a readable storage medium.

According to an aspect herein, electronic equipment includes a center frame, a first motor, a second motor, and a drive module. The first motor and the second motor are fixed respectively at a first designated location and a second designated location of the center frame. The drive module is electrically connected respectively to the first motor and the second motor. The drive module is adapted to: driving, according to a control signal, the first motor or the second motor to vibrate independently, or driving the first motor and the second motor to vibrate synchronously.

According to an aspect herein, a method for controlling a motor in electronic equipment may include:

acquiring a first set of voltages and a second set of voltages by acquiring detected voltages output by a magnetic field detector module by detection on a first motor and a second motor within a preset period of time;

in response to detecting an operation triggering a vibrational prompt, acquiring a first resonant frequency of the first motor for the moment according to the first set of voltages, and acquiring a second resonant frequency of the second motor for the moment according to the second set of voltages; and sending the first resonant frequency and the second resonant frequency to a drive module, such that the drive module drives, respectively according to the first resonant frequency and the second resonant frequency, the first motor and the second motor to vibrate synchronously to implement the vibrational prompt.

According to an aspect herein, a device for controlling a motor in electronic equipment includes a processor and memory.

The memory is adapted to storing an instruction executable by the processor. The processor is adapted to:

acquiring a first set of voltages and a second set of voltages by acquiring detected voltages output by a magnetic field detector module by detection on a first motor and a second motor within a preset period of time;

in response to detecting an operation triggering a vibrational prompt, acquiring a first resonant frequency of the first motor for the moment according to the first set of voltages, and acquiring a second resonant frequency of the second motor for the moment according to the second set of voltages; and sending the first resonant frequency and the second resonant frequency to a drive module, such that the drive module drives, respectively according to the first resonant frequency and the second resonant frequency, the first motor and the second motor to vibrate synchronously to implement the vibrational prompt.

According to an aspect herein, a non-transitory computer-readable storage medium has stored thereon an executable instruction that, when executed by a processor, causes the processor to implement the method.

The above general description and elaboration below are but exemplary and explanatory, and do not limit the subject disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
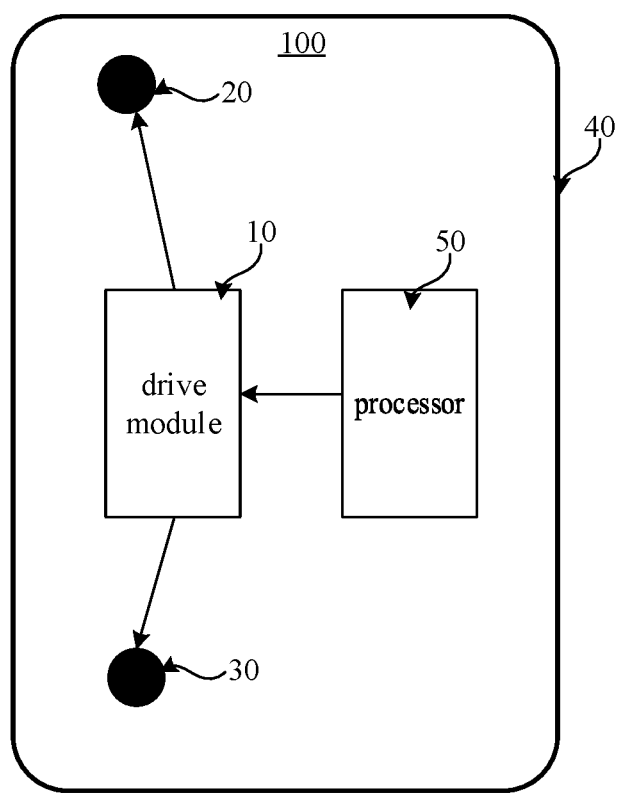
FIG. 1 is a block diagram of electronic equipment according to some embodiments of the disclosure.
Figure 2:
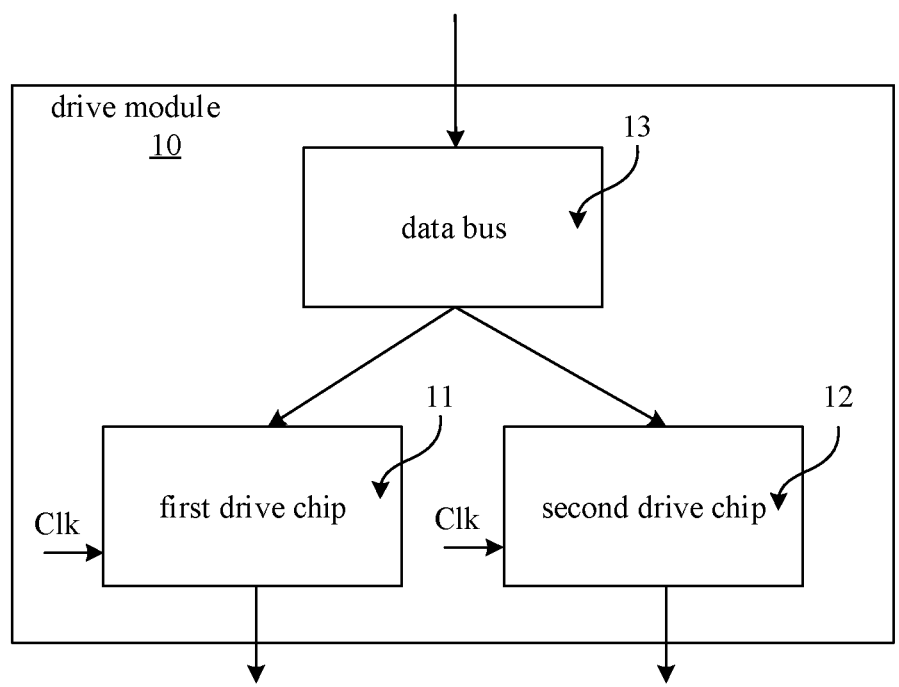
FIG. 2 is a block diagram of a drive module according to some embodiments of the disclosure.

Exemplary embodiments (examples of which are illustrated in the accompanying drawings) are elaborated below.

The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the device and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that."

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

At present, when using electronic equipment, a user may perform an operation such as a touch, a slide, a voice operation, etc. After the operation is completed, a motor in the electronic equipment may vibrate according to a control signal, thereby giving a feedback to the operation. The feedback is a so-called vibrational prompt.

In a practical application, only one motor may be arranged in electronic equipment. The motor may be arranged at a top or bottom of the electronic equipment. While the motor vibrates, there may be a balance point. A region around the balance point may barely vibrate (i.e., a fairly weak vibration may be sensed). Accordingly, in an application scene such as when a user holds the electronic equipment with both hands, effect of the vibrational prompt may weaken, lowering user experience.

In view of this, an embodiment herein provides electronic equipment. FIG. 1 is a block diagram of electronic equipment according to some embodiments of the disclosure. Referring to FIG. 1, electronic equipment 100 includes a center frame 40, a first motor 20, a second motor 30, and a drive module 10. The first motor 20 and the second motor 30 are fixed respectively at a first designated location and a second designated location of the center frame 40. The drive module 10 is electrically connected respectively to the first motor 20 and the second motor 30. The drive module is adapted to: driving, according to a control signal, the first motor 20 or the second motor 30 to vibrate independently, or driving the first motor 20 and the second motor 30 to vibrate synchronously.

Note that by using two motors for electronic equipment, effect of vibration that may not be achieved by using just one motor may be achieved. For example, in a scene such as a click, a slide, etc., two motors may be controlled to vibrate synchronously to translate entire electronic equipment vertically or horizontally, avoiding occurrence of a balance point, thus increasing amplitude of vibration of the electronic equipment, improving effect of a vibrational prompt, improving user experience. In another example, in a scene such as a shot in a war game, a collision in a driving game, etc., one of two motors may be controlled to vibrate with large amplitude, and the other motor may be controlled to vibrate with small amplitude, which may achieve three-dimensional vibration. For example, during a shot in a war game, given a location of a gun, a motor near the gun may be controlled to vibrate with large amplitude, and a motor away from the gun may be controlled to vibrate with small amplitude, achieving three-dimensional vibration, such that vibrations felt respectively with both hands may differ, improving experience of a user in playing a game with electronic equipment.

According to some embodiments, the first designated location and the second designated location may differ. For example, a display of electronic equipment may face a user. Then, the first designated location may be a location at the top of the center frame of the electronic equipment to the left or the right of the center point. The second designated location may be a location at the bottom of the center frame of the electronic equipment to the left or the right of the center point. In this way, when the first motor and the second motor vibrate, better vibration effect may be achieved.

According to some embodiments, the center frame, a housing of the first motor, and a housing of the second motor may be formed as one integral piece, avoiding cancellation of vibration due to a head-on collision caused by a play between a motor and the center frame. In addition, formation of one integral piece may avoid noise produced by resonance.

According to some embodiments, the first motor and the second motor each may be provided with a power end. The power end may be adapted to inputting a drive voltage. The electronic equipment may further include a motherboard (not shown in the figure). The motherboard may be fixed on a side of the center frame away from the display. The drive module 10 may be arranged on the motherboard. Two sets of elastic pieces may be arranged on the motherboard. The two sets of elastic pieces correspond respectively to the first designated location and the second designated location. In this case, the power end of the first motor may be in elastic contact with a first set of the two sets of elastic pieces. The power end of the second motor may be in elastic contact with a second of the two sets of elastic pieces. The drive module may be electrically connected to the first motor 20 and the second motor 30 respectively through the two sets of elastic pieces, and output voltages and currents to the first motor 20 and the second motor 30 to control the motors to vibrate.

According to some embodiments, given vibration effects of different application scenes, particularly when the first motor and the second motor vibrate synchronously, linear motors adapted to vibrating in one direction may be used. For example, considering a location of the electronic equipment as shown in FIG. 1, the linear motors may vibrate back and forth or from side to side. Of course, depending on a specific scene, a skilled person in the art may also use a rotary motor. Given that a rotated phase and an initial phase may be detected, the two motors may be controlled to rotate synchronously, a solution of which falls within the scope of the subject disclosure.

According to some embodiments, the drive module 10 may include a first drive chip 11 and a second drive chip 12. The first drive chip 11 may be adapted to driving the first motor 20. The second drive chip 12 may be adapted to driving the second motor 30. Given that the first motor 20 and the second motor 30 vibrate simultaneously, according to some embodiments, both the first drive chip 11 and the second drive chip 12 may use a clock signal (clk) provided by one clock source, avoiding a phase difference of $\pi$ between drive signals of the two motors due to drifts in clock signals, thereby avoiding cancellation of vibrations of the two motors.

Given that parasitic capacitance on a transmission line of a clock signal or a change in an ambient temperature may cause a change in a phase of the clock signal, according to some embodiments, a phase lock loop (not shown in the figure) may be arranged in each of the first drive chip 11 and the second drive chip 12. The phase lock loop may lock a phase of the clock signal, thereby ensuring that one clock signal having passed through the two drive chips may still have identical phases, facilitating synchronous vibration of the two motors.

In a practical application, the first motor 20 and the second motor 30 may achieve a transient of flutter or short-term vibration, given a drive signal of milliseconds required by the flutter or short-term vibration. It may take far more than milliseconds for a processor in the electronic equipment to generate the control signal according to a touch operation and send the control signal to the drive module. According to some embodiments, a preset pattern may be pre-stored in the drive module 10. The preset pattern may be stored in a random-access memory RAM. In this case, pins may be arranged on the first drive chip 11 and the second drive chip 12. The pins may be electrically connected to a touch button (not shown in the figure) on the electronic equipment. Consider synchronous drive, for example. In response to a touch operation on the touch button, the first drive chip 11 and the second drive chip 12 may read the preset pattern directly from the RAM to control the first motor 20 and the second motor 30 to flutter or perform short-term vibration. A signal of the touch operation may reach the first drive chip 11 and the second drive chip 12 directly without being processed with software, thereby reducing an interval between trigger and vibration, improving vibration effect.

Figure 3:
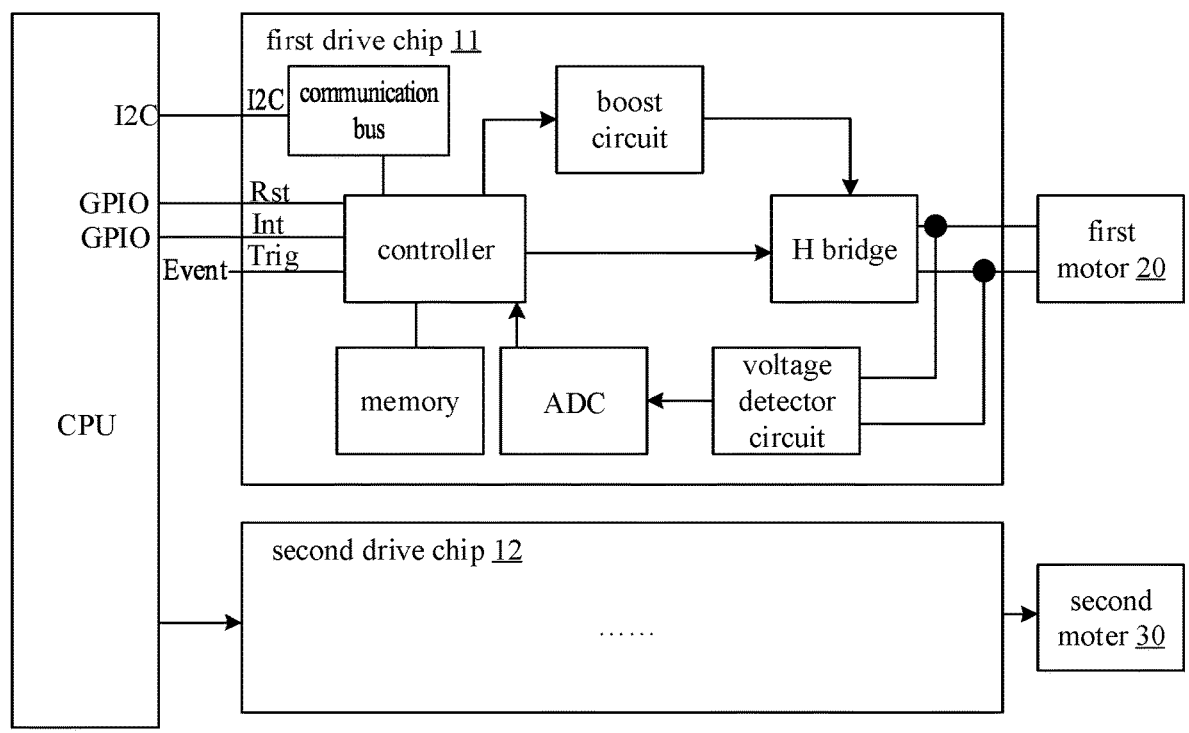
FIG. 3 is a block diagram of electronic equipment according to some embodiments of the disclosure.

In a practical application, the drive chips 11, 12 may input a pair of differential signals as drive signals to the motors 20, 30. A drive signal may first be input to a first power end (haptic+) and a second power end (haptics−) of a motor, go through differential processing, and then enter a coil internal to the motor. Accordingly, the coil may generate an alternating magnetic field. An internal structure of the first drive chip 11 is shown in FIG. 3. An internal structure of the second drive chip 12 is identical to the internal structure of the first drive chip 11 and is not shown in the figure. Referring to FIG. 3, the first drive chip 11 may be electrically connected to a processor CPU through a communication bus such as an Inter-Integrated Circuit (I2C) or a Serial Peripheral Interface (SPI). The CPU may configure and initialize the first drive chip 11 through the communication bus. For example, the processor may store the preset pattern in the RAM.

Figure 4:
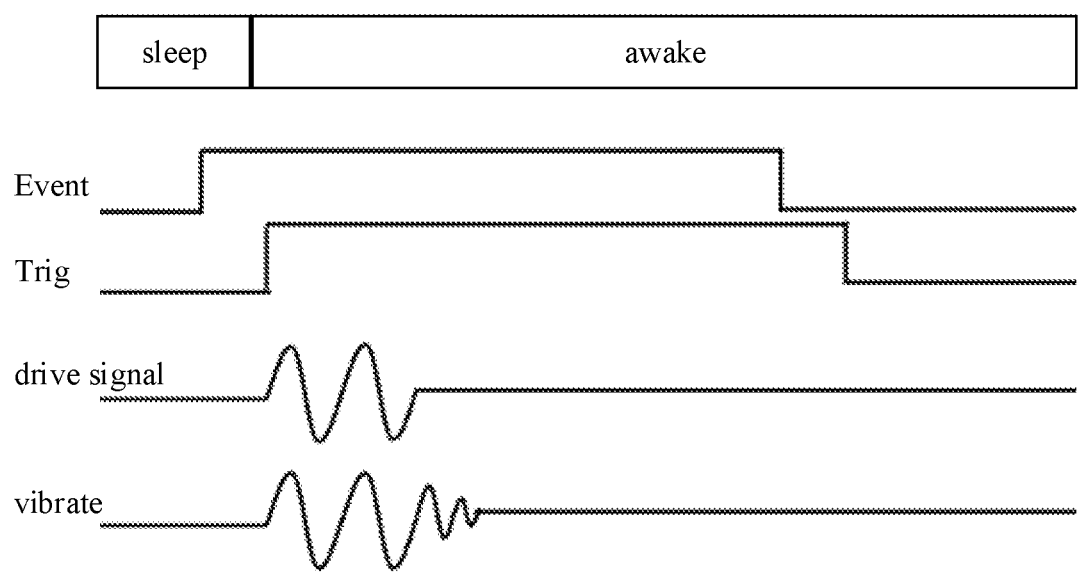
FIG. 4 is a diagram of a time sequence when a drive motor vibrates according to some embodiments of the disclosure.

Again referring to FIG. 3, a touch signal trig may be generated upon an event of trigger of the touch button, and may be stored in the RAM. When receiving the signal trig, the first drive chip 11 may acquire the preset pattern to control the first motor 20 to vibrate, in timing as shown in FIG. 4. After the drive signal disappears, the first motor 20 may start to damp automatically. The vibration may continue for a few cycles. According to some embodiments, to allow the first motor 20 to vibrate with greater amplitude, less rise time, and less drop time, an output voltage of the first drive chip 11 may be boosted, by arranging a boost circuit in the first drive chip 11. The boost circuit may be as shown in FIG. 5.

Figure 5:
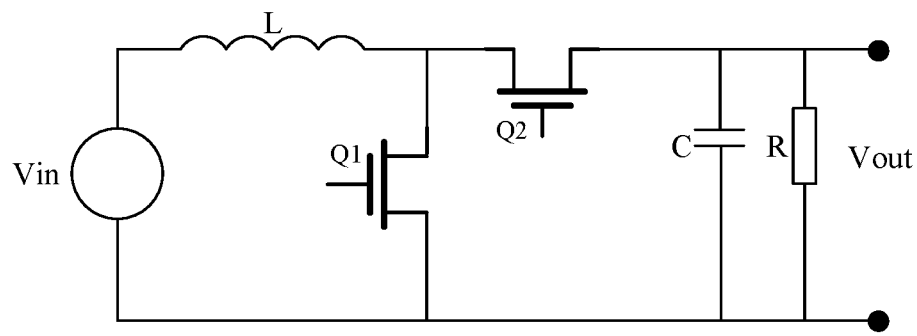
FIG. 5 is a diagram of a boost circuit according to some embodiments of the disclosure.

Referring to FIG. 5, the boost circuit may work as follows. In a first stage, a switch Q1 may be switched on. A switch Q2 may be switched off. A current may circulate in a loop L1. A power supply may charge an inductor L. In this case, a voltage over the inductor may be positive on the left and negative on the right. In a second stage, the switch Q1 may be switched off. The switch Q2 may be switched on. A current may circulate in a loop L2. According to Lenz's law, the voltage across the inductor L may be negative on the left and positive on the right. In this case, the inductor L may serve as an equivalent power supply. I.e., a voltage across a capacitor C may be superposition of a power supply voltage Vin and an inductor voltage VL. I.e., Vout=Vin+VL>Vin. Assume that the input voltage Vin and the output voltage Vout are related by a formula (1) as follows.

$$Vout=Vin/(1-D)$$

In the formula (1), D may be a duty cycle, i.e., a ratio of a high level of a pulse to a periodic signal, with 0<D<1, and 0<(1−D)<1. Therefore, Vout>Vin, achieving a boost in voltage.

Accordingly, with the embodiment, a boost circuit may be arranged, which may increase a drive force of the first motor 201, thus increasing amplitude of vibration. However, damping may increase as well in this case, thereby reducing the rise time and the drop time.

After a boost circuit is adopted, during vibration, particularly transient short-term vibration, of a motor, the drive module 10 may output voltage of about 11V. Resistance of the first motor and the second motor may be about a few ohms. In this case, transient current in the drive module 10, the first motor 20, and the second motor 30 may exceed 10 amperes. Thus, a voltage drop over a battery in the electronic equipment 100 may increase suddenly, which may cause power-down protection of the battery, causing sudden shutdown of the electronic equipment. Therefore, again referring to FIG. 3, in some embodiments, a voltage detector circuit and an Analog-to-Digital Converter (ADC) circuit may be arranged. Input voltages of the first motor 20 and the second motor 30 may be detected using the voltage detector circuit, converted by the ADC, and sent to the processor 50 through a controller. The processor 50 may acquire the input voltage of the first motor 20 and the input voltage of the second motor 30 respectively, and generate the control signal according to the input voltage of the first motor 20 and the input voltage of the second motor 30. The drive module 10 may regulate the output voltage using the control signal, to reduce amplitudes respectively with which the first motor 20 and the second motor 30 vibrate. Thus, current in the first motor 20 and the second motor 30 may be reduced, reducing the voltage drop over the battery, ensuring that the battery powers another part of the electronic equipment normally.

In a practical application, a vibrator 12 in a motor (20, 30) may be subjected to both an elastic force of a spring and a magnetic field force. When the motor resonates, the motor may generate a maximal induced electromotive force U, shown by a formula as follows.

$$\vec{U} = \vec{B}Lv = \vec{B}L\sqrt{\frac{k}{m}A}$$

In the formula, the $\vec{B}$ may represent intensity of an alternating magnetic field. The L may represent a length of a coil internal to a motor. The V may represent velocity of a vibrator. The k may represent a stiffness coefficient of a spring in the motor. The m may represent mass of the vibrator.

Figure 6:
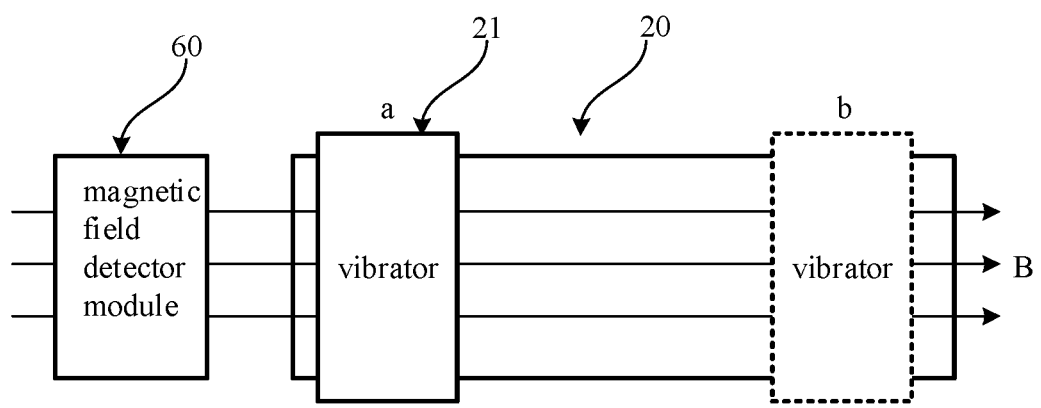
FIG. 6 is a diagram of locations of a magnetic field detector module and a linear motor according to some embodiments of the disclosure.

Based on the above principle, consider the first motor 20, for example. Referring to FIG. 6, in some embodiments, the electronic equipment may include a magnetic field detector module 60. The magnetic field detector module 60 may be arranged at a location around the first motor 20. The location around the first motor may be a location where the magnetic field detector module 60 may detect the alternating magnetic field generated by the first motor 20. Consider that the first motor is a linear motor, for example. The magnetic field detector module 60 may be arranged around one of two ends of the motor. The magnetic field detector module may be arranged on the left of a location a. The magnetic field detector module may be arranged on the right of a location b. In some embodiments, the magnetic field detector module 60 may be arranged inside the linear motor, i.e., at a location between the location a and the location b. Of course, according to some embodiments, a magnetic sensor in the magnetic field detector module 60 may be arranged outside or inside the linear motor. The magnetic sensor may output a detected voltage outside the linear motor. It may be understood that a solution falls within the scope of the subject disclosure if the alternating magnetic field may be detected.

Figure 7:
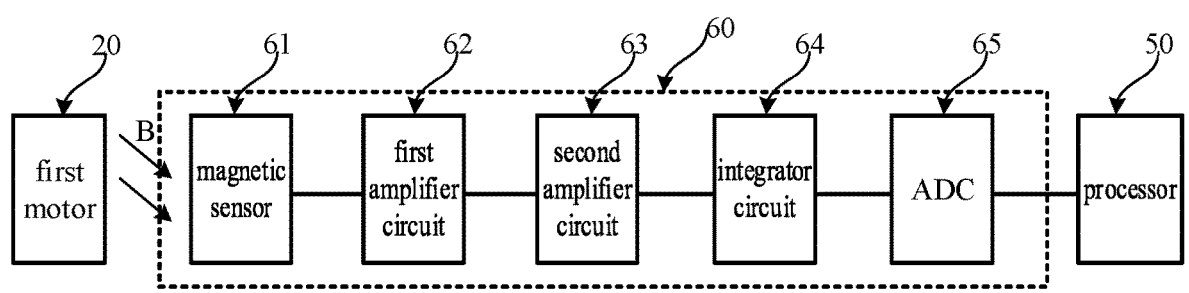
FIG. 7 is a block diagram of a magnetic field detector module according to some embodiments of the disclosure.

FIG. 7 is a block diagram of electronic equipment according to some embodiments of the disclosure. Referring to FIG. 7, a magnetic field detector module 60 may include a magnetic sensor 61, a first amplifier circuit 62, a second amplifier circuit 63, an integrator circuit 64, and an ADC 65.

The magnetic sensor 61 may be adapted to sensing and detecting the alternating magnetic field generated by the first motor 20 to generate a first voltage.

The first amplifier circuit 62 may be adapted to amplifying the first voltage to acquire a second voltage.

The second amplifier circuit 63 may be adapted to amplifying the second voltage to acquire a third voltage.

The integrator circuit 64 may be adapted to integrating the third voltage within a sampling period to acquire an integrated voltage.

The ADC 65 may be adapted to converting the integrated voltage to acquire a detected voltage.

According to some embodiments, the magnetic sensor 61 may be implemented by a Hall sensor. Of course, the magnetic sensor 61 may also be implemented by an electromagnetic coil made using a principle applying to an electromagnet. Such a solution falls within the scope of the subject disclosure.

Figure 8:
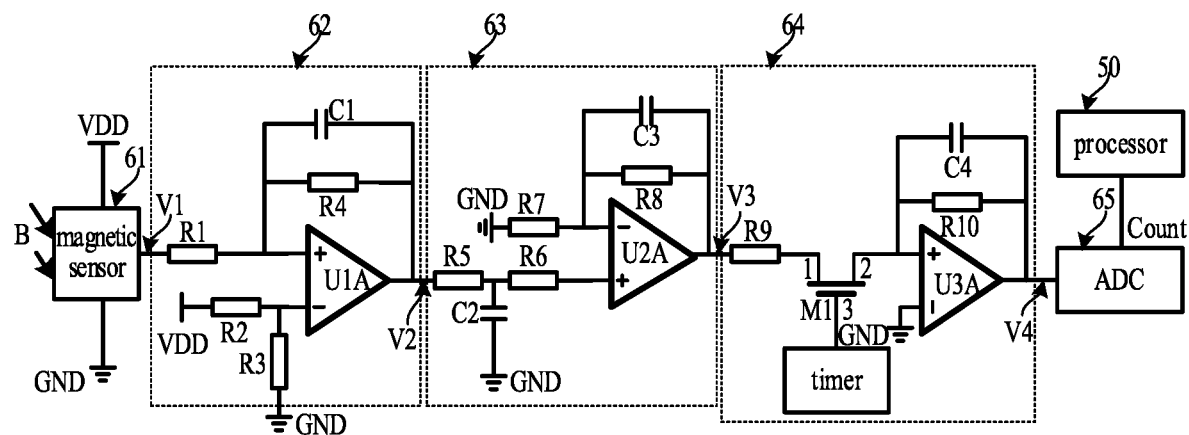
FIG. 8 is a diagram of a circuit of a magnetic field detector module according to some embodiments of the disclosure.

According to some embodiments, referring to FIG. 8, the first amplifier circuit 62 may include a first resistor R1, a second resistor R2, a third resistor R3, a fourth resistor R4, a first capacitor C1, and a first operational amplifier U1A.

The first resistor R1 may be connected in series between the magnetic sensor 61 and an in-phase input end (denoted by "+") of the first operational amplifier U1A.

The fourth resistor R4 may be connected in series between the in-phase input end and an output end of the first operational amplifier U1A.

The first capacitor C1 may be connected in series between the in-phase input end and the output end of the first operational amplifier U1A.

A phase-reversed input end (denoted by "−") of the first operational amplifier U1A may be grounded GND through the third resistor R3, and connected to a preset power supply VDD through the second resistor R2. The output end of the first operational amplifier U1A may be connected to an output end of the first amplifier circuit.

According to some embodiments, the fourth resistor R4 and the first capacitor C1 may form a low-pass filter with a passband cutoff frequency $$f_1 = \frac{1}{2\pi R_4 C_1}.$$

According to some embodiments, the second resistor R2 and the third resistor R3 may form a voltage divider circuit with a partial voltage for eliminating a bias voltage of the first operational amplifier U1A.

According to some embodiments, the first operational amplifier U1A, the first resistor R1, the second resistor R2, the third resistor R3, and the fourth resistor R4 may form an in-phase circuit with an amplifier factor $$A_1 = 1 + \frac{R_4}{R_1}.$$

Moreover, according to some embodiments, the in-phase circuit may increase a signal-to-noise ratio.

The first amplifier circuit 62 may work as follows. Having detected the alternating magnetic field generated by a motor, the magnetic sensor 61 may output the first voltage V. The first amplifier circuit 62 may amplify the first voltage V1 to acquire the second voltage $$V_2 = A_1 V_1 = \left(1 + \frac{R_4}{R_1}\right) V_1.$$

Again referring to FIG. 8, the second amplifier circuit 63 may include a second operational amplifier U2A, a fifth resistor R5, a sixth resistor R6, a second capacitor C2, a seventh resistor R7, an eighth resistor R8, and a third capacitor C3.

A first end of the fifth resistor R5 (the end of R5 to the left in FIG. 8) may be connected to the output end of the first amplifier circuit 62. A second end of the fifth resistor (the end of R5 to the right in FIG. 8) may be connected to an in-phase input end (denoted by "+") of the second operational amplifier U2A through the sixth resistor R6. An output end of the second operational amplifier may be connected to an output end of the second amplifier circuit 63.

A first end of the second capacitor C2 (upper end of C2 in FIG. 8) may be connected to the second end of the fifth resistor R5. A second end (lower end of C2 in FIG. 8) may be grounded GND.

A phase-reversed input end (denoted by "−") of the second operational amplifier U2A may be grounded GND through the seventh resistor R7.

The eighth resistor R8 may be connected in series between the phase-reversed input end and the output end of the second operational amplifier U2A.

The third capacitor C3 may be connected in series between the phase-reversed input end and the output end of the second operational amplifier U2A.

According to some embodiments, the fifth resistor R5 and the second capacitor C2 may form a low-pass filter with a passband cutoff frequency $$f_2 = \frac{1}{2\pi R_5 C_2}.$$

According to some embodiments, the second operational amplifier U2A, the seventh resistor R7, the eighth resistor R8, and the sixth resistor R6 may form an in-phase circuit with an amplifier factor $$A_2 = 1 + \frac{R_8}{R_7}.$$

Therefore, the second amplifier circuit 63 may amplify the first voltage V1 by the factor A2 to acquire the third voltage $$V_3 = A_2 V_2 = \left(1 + \frac{R_8}{R_7}\right) V_2.$$

Again referring to FIG. 8, the integrator circuit 64 may include a third operational amplifier U3A, a ninth resistor R9, a tenth resistor R10, a first switch M1, and a timer.

A first end of the first switch M1 (denoted by "1") may be connected to the output end of the second amplifier circuit 63 through the ninth resistor R9. A second end (denoted by "2") of the first switch may be connected to an in-phase input end (denoted by "+") of the third operational amplifier U3A. A control end (denoted by "3") of the first switch may be connected to the timer.

The tenth resistor R10 may be connected in series between an in-phase input end and an output end of the third operational amplifier U3A.

The fourth capacitor C4 may be connected in series between the in-phase input end and the output end of the third operational amplifier U3A.

The output end of the third operational amplifier U3A may be connected to an output end of the integrator circuit 64.

Thus, the timer may output a pulse signal according to a preset sampling period, thereby switching on and switching off the first switch M1. When the first switch M1 is switched on, the fourth capacitor C4 may be charged. When the first switch M1 is switched off, the fourth capacitor C4 may be discharged through the tenth resistor R10. It may be understood that the tenth resistor R10 may be arranged with large resistance, thereby limiting a rate at which the fourth capacitor C4 is discharged. Accordingly, the integrated voltage V4 output by the integrator circuit may equal the third voltage V3.

According to some embodiments, after the integrator circuit 64 has output the integrated voltage V4, the ADC 65 may convert the integrated voltage V4 into a digital voltage. In an example, the ADC 65 may sample at a high speed, with a sampling period of a magnitude such as of microseconds, much lower than a period of milliseconds with which a magnetic field changes, to acquire a detected voltage Count. In an example, the detected voltage Count may be expressed by eight binary digits.

According to some embodiments, the processor 50 may acquire the detected voltage Count output by the ADC 65. The detected voltage Count output by the ADC 65 within a preset period of time may be acquired to form a set of detected voltages, referred to as a first set of voltages hereafter to distinguish from a set of detected voltages corresponding to the second motor 30.

Then, a user using the electronic equipment may perform an operation such as a touch, a slide, a gesture, etc., that triggers a vibrational prompt. After such a vibrational prompt trigger operation is detected, in response to detecting the operation triggering the vibrational prompt, the processor 50 may acquire a resonant frequency of the motor for the moment according to the first set of voltages. For example, given that a magnetic sensor senses a maximal induced electromotive force when the motor resonates, the processor 50 may acquire a maximum detected voltage in the first set of voltages detected within the preset period of time, and a peak detected voltage neighboring the maximum detected voltage. Moreover, the processor 50 may acquire a count of detected voltages between the maximum detected voltage and the peak detected voltage. The processor may determine a period of vibration of the motor according to the count and a detection interval between two neighboring detected voltages. If there are 3 detected voltages between the maximum detected voltage and the peak detected voltage, and the sampling period is 10 ms, then the period of vibration may be (3+1)*10 ms=40 ms.

Finally, the processor 50 may determine, according to the period of vibration, the resonant frequency of the first motor 20 for the moment, referred to hereafter as a first resonant frequency, to distinguish from the resonant frequency of the second motor 30 for the moment.

According to some embodiments, the processor 50 may send the first resonant frequency to the first drive chip 11. The processor may send the second resonant frequency to the second drive chip 12. Accordingly, the first drive chip 11 may read the preset pattern from a local memory to drive the first motor 20 to vibrate. The second drive chip 12 may read the preset pattern from a local memory to drive the second motor 30 to vibrate, guaranteeing that the motors implement the vibrational prompt by vibrating with maximal amplitudes. The first motor 20 and the second motor 30 may vibrate synchronously. The first motor and the second motor may vibrate independently. The preset pattern may be acquired based on extensive experiments. A preset pattern may be set for each resonant frequency. Details thereof are not elaborated here.

Note that as the resonant frequency of the first motor 20 may offset slowly, the resonant frequency may be updated at intervals, such as weekly, monthly, etc. No limit is set herein.

According to some embodiments, the electronic equipment 100 may further include an audio module (not shown in the figure). The audio module may be adapted to acquiring an envelope signal of audio data and sending the envelope signal to the processor. The processor may be adapted to generating a drive signal according to the envelope signal, and sending the drive signal to the drive module. The drive module may be adapted to controlling, according to the drive signal, at least one of the first motor or the second motor to vibrate with the audio data.

Figure 9:
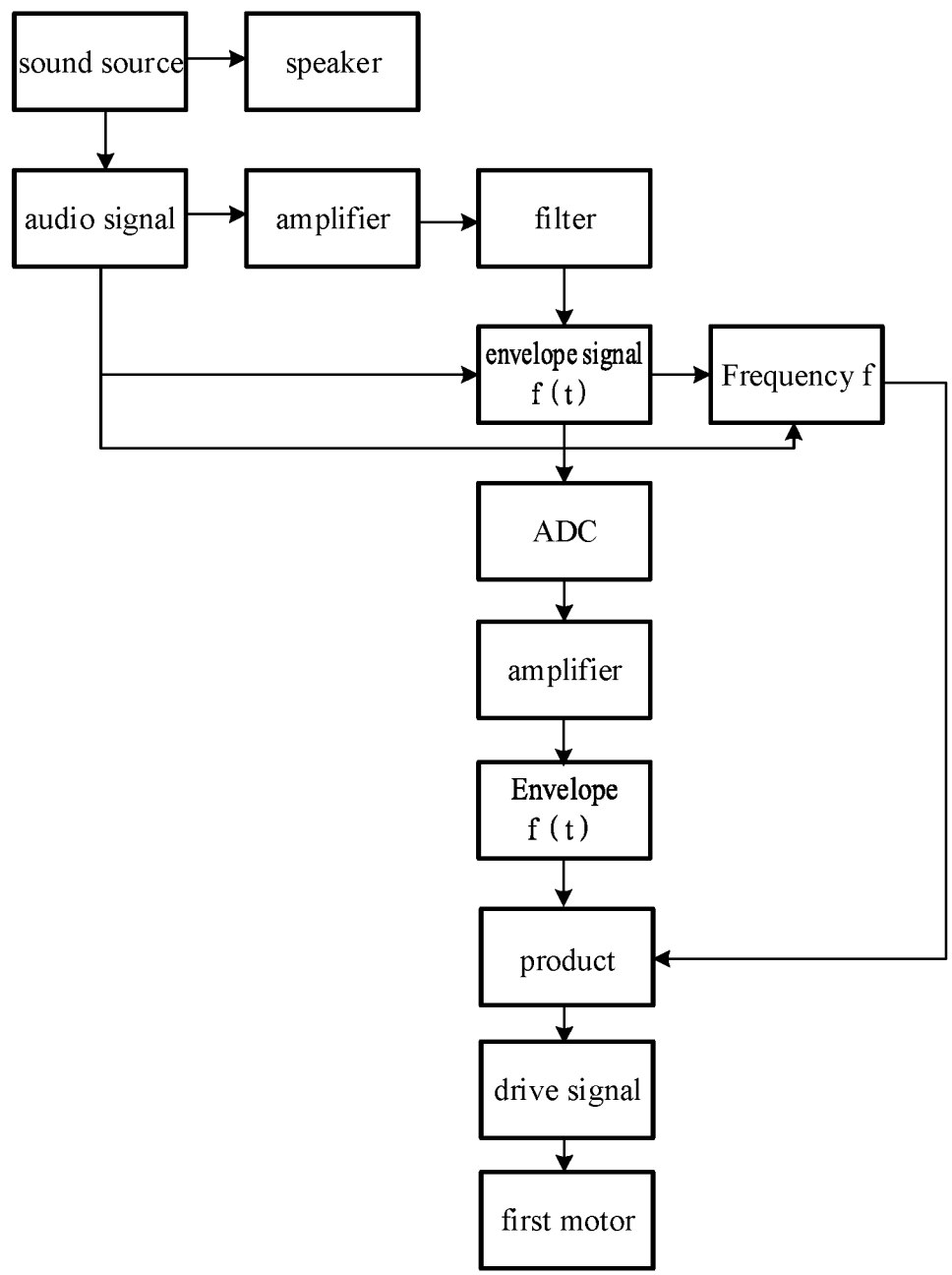
FIG. 9 is a flowchart of controlling vibration of a motor according to an audio signal according to some embodiments of the disclosure.

Referring to FIG. 9, information on a sound source may be acquired. An audio signal may be separated. The audio signal may be divided into two routes of audio signals. One route of audio signal may be output to a speaker. The other route of audio signal may be processed as follows. The audio signal may be input to an amplifier and amplified, and then go through a filter to filter out a noise introduced by the amplifier. A frequency and an envelope signal f(t) of the filtered audio signal may be acquired. Meanwhile, the frequency of the envelope signal may be filtered to ensure that the signal selected for driving the motor may be of the identical frequency as the audio. Then, amplitude of the selected envelope signal may be sampled by the ADC, computed, and compared. Amplitude $A_n$ for the current time point may be compared to amplitude $A_{n+1}$ at the next time point. When $A_n < A_{n+1}$, amplitude of the signal of the frequency f may be increased, i.e., with an amplifier factor F>1. When $A_n = A_{n+1}$, the amplifier factor F=1, and no amplification is performed. When $A_n > A_{n+1}$, the amplifier factor <1, and the drive signal of the frequency f is not amplified.

The first drive chip 11 and the second drive chip 12 may output a maximum drive voltage Vmax. An original audio signal may be of maximum amplitude V1. Then, the audio drive signal may be of a maximum amplifier factor F=Vmax/V1. The ADC may sample at a frequency f1. Then, amplification or diminishment may take place only within a ¼ of the period of the signal. I.e., amplification or diminishment may take place at a frequency f1/4. Then, at each ADC sample, a factor of the amplification or diminishment may be no greater than F. If an audio signal of a frequency f approaches Vmax, the maximum amplifier factor may be F. The amplifier factor may be determined according to the result of ADC sampling to form the envelope signal f(t). The amplified envelope signal may have to be restored to the original audio signal f. I.e., a final drive signal may be acquired by multiplying the amplified envelope signal by an extracted frequency signal, to drive the motor to vibrate. In this case, the motor may vibrate with the audio data. Depending on a location of a sound source in a picture on the display, audio signals at the locations of the first motor and the second motor may differ somehow. In this case, the first motor and the second motor may vibrate synchronously with different amplitudes, achieving three-dimensional vibration, improving user experience.

With some embodiments herein, a first motor is fixed at a first designated location. A second motor is fixed at a second designated location. A drive module controls, according to a control signal, the first motor and the second motor to vibrate independently or synchronously. According to some embodiments, the first motor and the second motor may vibrate synchronously, for example, the entire electronic equipment may be translated vertically or from side to side, allowing the entire electronic equipment to vibrate, avoiding occurrence of a balance point, thus increasing amplitude of vibration of the electronic equipment, improving effect of a vibrational prompt, improving user experience.

Figure 10:
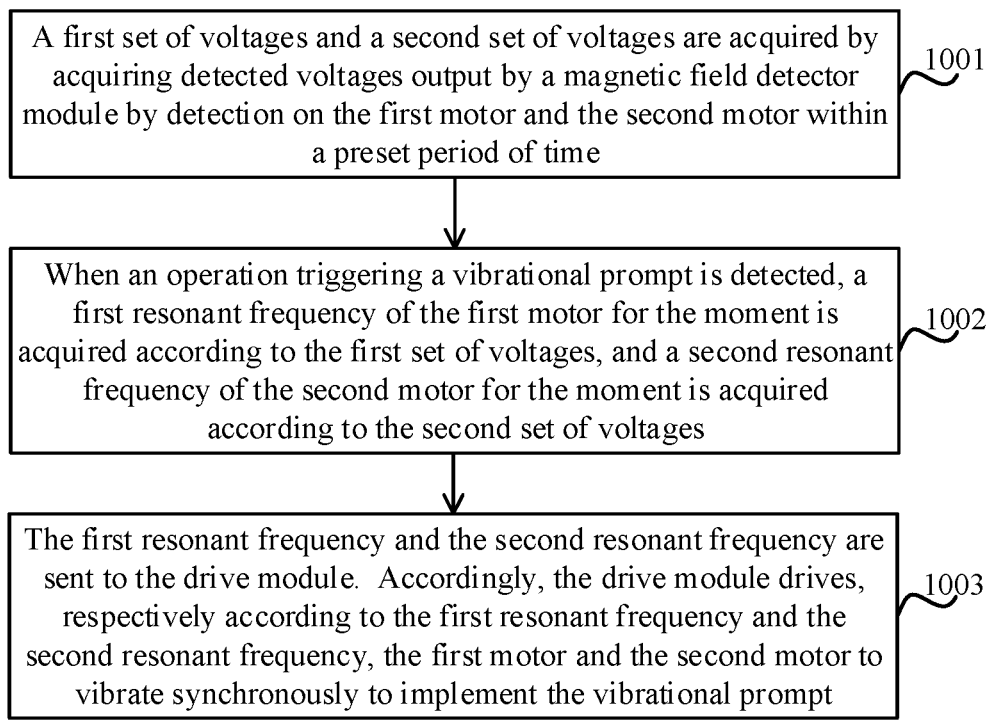
FIG. 10 is a flowchart of a method for controlling a motor in electronic equipment according to some embodiments of the disclosure.

Based on the electronic equipment, according to some embodiments herein, a method for controlling a motor in electronic equipment may apply to the electronic equipment according to embodiments as shown in FIG. 1 through FIG. 9. Referring to FIG. 10, a method for controlling a motor in electronic equipment may include a block as follows.

In 1001, a first set of voltages and a second set of voltages are acquired by acquiring detected voltages output by a magnetic field detector module by detection on the first motor and the second motor within a preset period of time.

In 1002, when an operation triggering a vibrational prompt is detected, a first resonant frequency of the first motor for the moment is acquired according to the first set of voltages, and a second resonant frequency of the second motor for the moment is acquired according to the second set of voltages.

In 1003, the first resonant frequency and the second resonant frequency are sent to the drive module. Accordingly, the drive module drives, respectively according to the first resonant frequency and the second resonant frequency, the first motor and the second motor to vibrate synchronously to implement the vibrational prompt.

Figure 11:
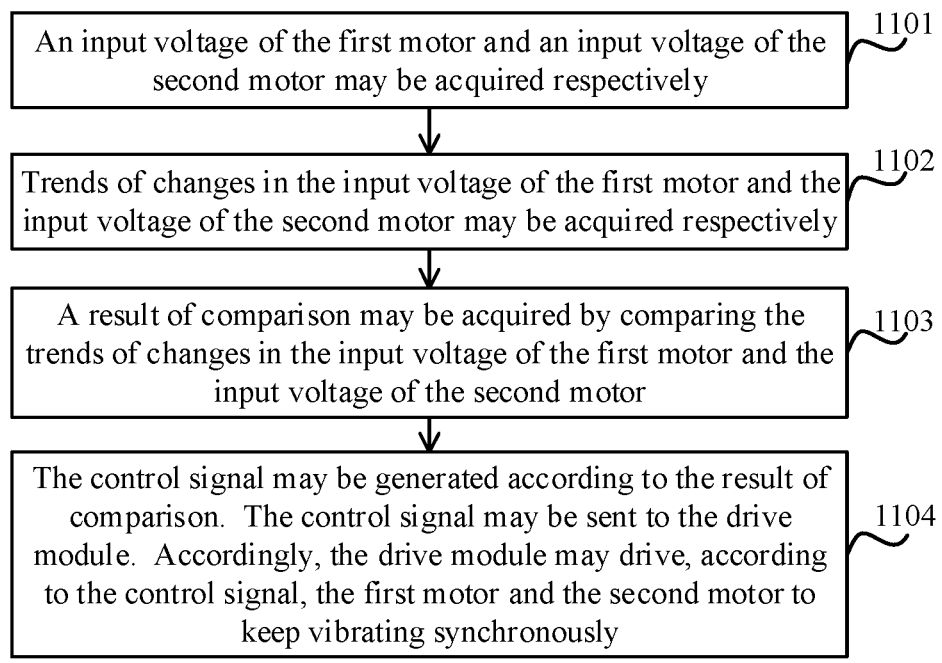
FIG. 11 is a flowchart of a method for controlling a motor in electronic equipment according to some embodiments of the disclosure.

According to some embodiments, referring to FIG. 11, the method may further include a block as follows.

In 1101, an input voltage of the first motor and an input voltage of the second motor may be acquired respectively.

In 1102, trends of changes in the input voltage of the first motor and the input voltage of the second motor may be acquired respectively.

In 1103, a result of comparison may be acquired by comparing the trends of changes in the input voltage of the first motor and the input voltage of the second motor.

In 1104, the control signal may be generated according to the result of comparison. The control signal may be sent to the drive module. Accordingly, the drive module may drive, according to the control signal, the first motor and the second motor to keep vibrating synchronously.

Figure 12:
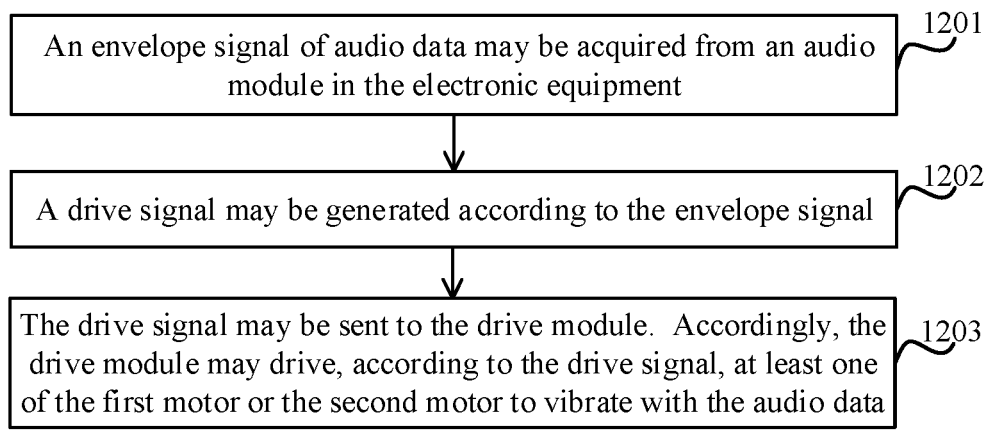
FIG. 12 is a flowchart of a method for controlling a motor in electronic equipment according to some embodiments of the disclosure.

According to some embodiments, referring to FIG. 12, the method may further include a block as follows.

In 1201, an envelope signal of audio data may be acquired from an audio module in the electronic equipment.

In 1202, a drive signal may be generated according to the envelope signal.

In 1203, the drive signal may be sent to the drive module. Accordingly, the drive module may drive, according to the drive signal, at least one of the first motor or the second motor to vibrate with the audio data.

Refer to elaboration of how the electronic equipment as shown in FIG. 1 through FIG. 9 works for content of the method according to some embodiments, which is not repeated here.

Figure 13:
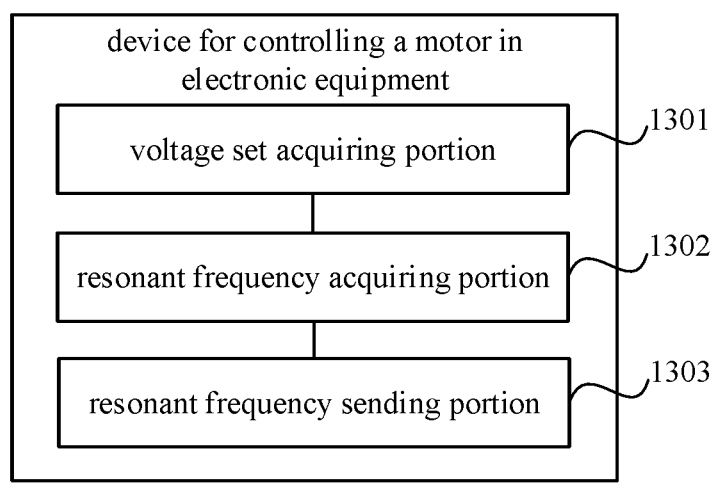
FIG. 13 is a block diagram of a device for controlling a motor in electronic equipment according to some embodiments of the disclosure.

According to some embodiments herein, a device for controlling a motor in electronic equipment may be based on the method for controlling a motor in electronic equipment. Referring to FIG. 13, a device for controlling a motor in electronic equipment may include a voltage set acquiring module, a resonant frequency acquiring module, and a resonant frequency sending module.

The voltage set acquiring portion 1301 may be adapted to acquiring a first set of voltages and a second set of voltages by acquiring detected voltages output by a magnetic field detector module by detection on the first motor and the second motor within a preset period of time.

The resonant frequency acquiring portion 1302 may be adapted to, in response to detecting an operation triggering a vibrational prompt, acquiring a first resonant frequency of the first motor for the moment according to the first set of voltages, and acquiring a second resonant frequency of the second motor for the moment according to the second set of voltages.

The resonant frequency sending portion 1303 may be adapted to sending the first resonant frequency and the second resonant frequency to the drive module. Accordingly, the drive module may drive, respectively according to the first resonant frequency and the second resonant frequency, the first motor and the second motor to vibrate synchronously to implement the vibrational prompt.

Figure 14:
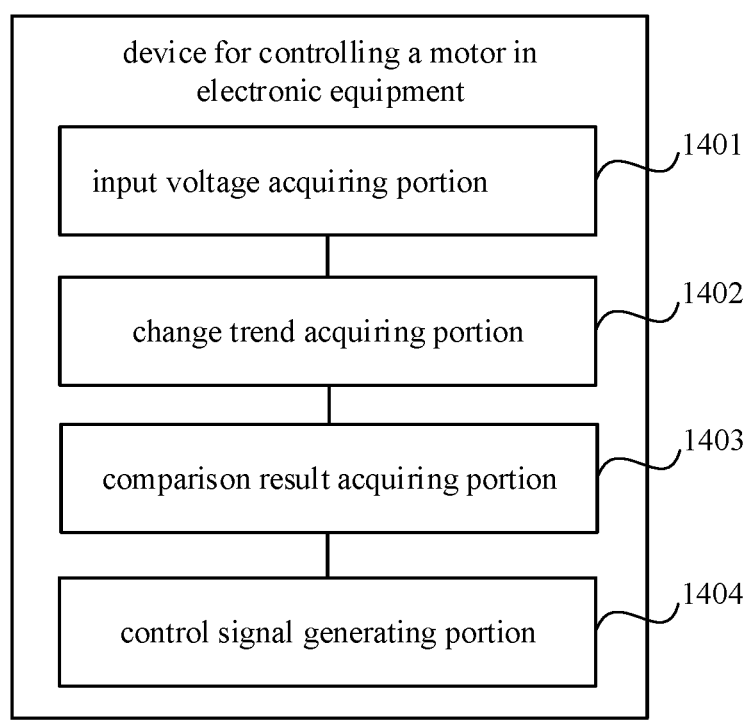
FIG. 14 is a block diagram of a device for controlling a motor in electronic equipment according to some embodiments of the disclosure.

According to some embodiments, referring to FIG. 14, the device may further include an input voltage acquiring module, a change trend acquiring module, a comparison result acquiring module, and a control signal generating module.

The input voltage acquiring portion 1401 may be adapted to acquiring an input voltage of the first motor and an input voltage of the second motor respectively.

The change trend acquiring portion 1402 may be adapted to acquiring trends of changes in the input voltage of the first motor and the input voltage of the second motor respectively.

The comparison result acquiring portion 1403 may be adapted to acquiring a result of comparison by comparing the trends of changes in the input voltage of the first motor and the input voltage of the second motor.

The control signal generating portion 1404 may be adapted to generating the control signal according to the result of comparison, and sending the control signal to the drive module. Accordingly, the drive module may drive, according to the control signal, the first motor and the second motor to keep vibrating synchronously.

Figure 15:
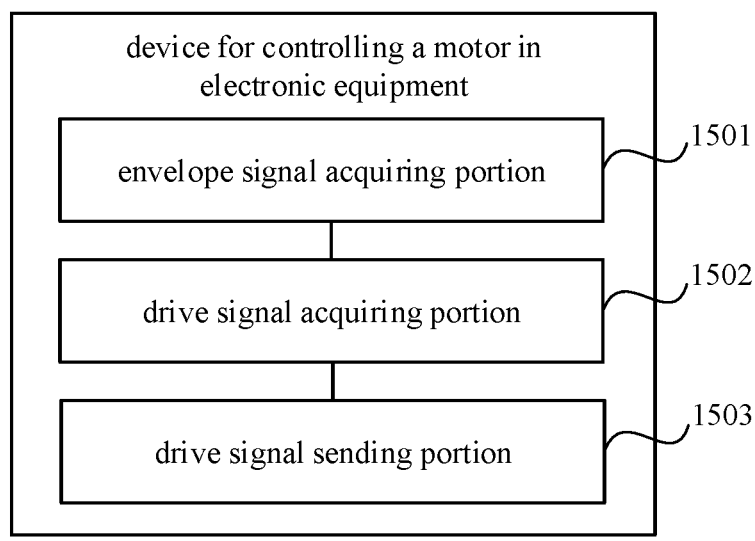
FIG. 15 is a block diagram of a device for controlling a motor in electronic equipment according to some embodiments of the disclosure.

According to some embodiments, referring to FIG. 15, the device may further include an envelope signal acquiring module, a drive signal acquiring module, and a drive signal sending module.

The envelope signal acquiring portion 1501 may be adapted to acquiring an envelope signal of audio data from an audio module in the electronic equipment.

The drive signal acquiring portion 1502 may be adapted to generating a drive signal according to the envelope signal.

The drive signal sending portion 1503 may be adapted to sending the drive signal to the drive module. Accordingly, the drive module may drive, according to the drive signal, at least one of the first motor or the second motor to vibrate with the audio data.

According to an aspect herein, a device for controlling a motor in electronic equipment includes a processor and memory.

The memory is adapted to storing an instruction executable by the processor. The processor is adapted to implementing a method herein.

Refer to content of the method according to some embodiments for content of the device according to some embodiments, which is not repeated here.

According to an aspect herein, a non-transitory computer-readable storage medium has stored thereon an executable instruction that, when executed by a processor, causes the processor to implement a method herein.

Figure 16:
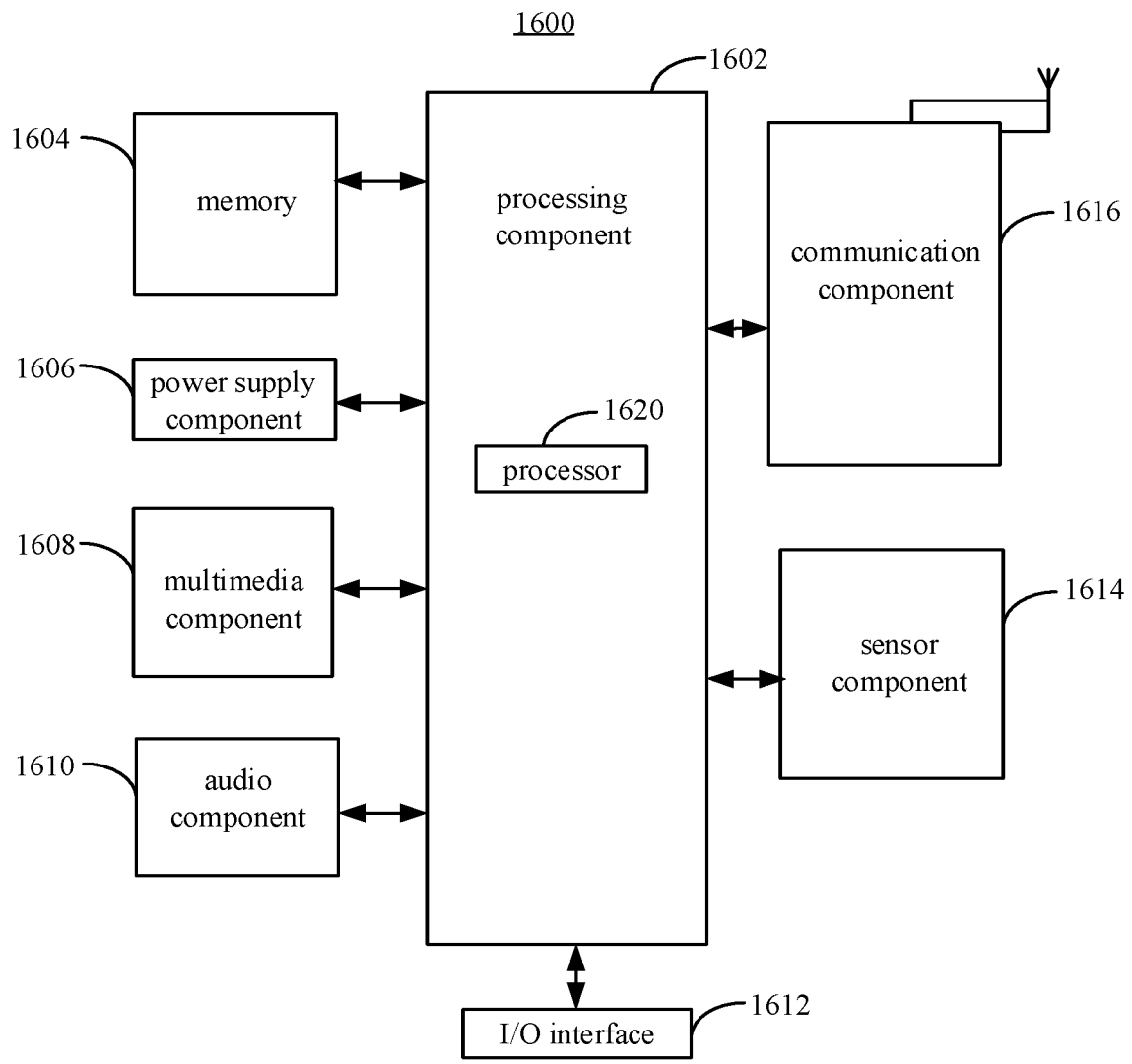
FIG. 16 is a block diagram of electronic equipment according to some embodiments of the disclosure.

FIG. 16 is a block diagram of electronic equipment according to some embodiments of the disclosure. For example, the electronic equipment 1600 can be a mobile terminal such as a smart phone, a computer, digital broadcast UE, tablet equipment, medical equipment, fitness equipment, a Personal Digital Assistant, etc., that includes a circuit as shown in FIG. 1 through FIG. 9.

Referring to FIG. 16, the electronic equipment 1600 may include one or more of a processing component 1602, memory 1604, a power supply component 1606, a multimedia component 1608, an audio component 1610, an Input/Output (I/O) interface 1612, a sensor component 1614, a communication component 1616, an image collecting component 1618 (not shown in the figure), etc.

The processing component 1602 may generally control an overall operation of the electronic equipment 1600, such as operations associated with display, a telephone call, data communication, a camera operation, a recording operation, etc. The processing component 1602 may include one or more processors 1620 to execute instructions so as to complete all or some blocks of the method. In addition, the processing component 1602 may include one or more modules to facilitate interaction between the processing component 1602 and other components. For example, the processing component 1602 may include a multimedia module to facilitate interaction between the multimedia component 1608 and the processing component 1602.

The memory 1604 may be adapted to storing various types of data to support the operation at the electronic equipment 1600. Examples of such data may include instructions of any application or method adapted to operating on the electronic equipment 1600, contact data, phone book data, messages, pictures, videos, etc. The memory 1604 may be realized by any type of transitory or non-transitory storage equipment or combination thereof, such as Static Random-Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, or a compact disk.

The power supply component 1606 may supply electric power to various components of the electronic equipment 1600. The power supply component 1606 may include a power management system, one or more power sources, and other components related to generating, managing and distributing electricity for the electronic equipment 1600.

The multimedia component 1608 may include a screen providing an output interface between the electronic equipment 1600 and a target object. The screen may include a Liquid Crystal Display (LCD), and/or a Touch Panel (TP). In some embodiments, organic light-emitting diode (OLED) or other types of displays can be employed. If the screen includes a TP, the screen may be realized as a touch screen to receive an input signal from a target object. The TP may include one or more touch sensors for sensing touch, slide and gestures on the TP. The touch sensors not only may sense the boundary of a touch or slide move, but also detect the duration and pressure related to the touch or slide move. The multimedia component 1608 may include a front camera and/or a rear camera. When the electronic equipment 1600 is in an operation mode such as a photographing mode or a video mode, the front camera and/or the rear camera may receive external multimedia data. Each of the front camera or the rear camera may be a fixed optical lens system or may have a focal length and be capable of optical zooming.

The audio component 1610 may be adapted to outputting and/or inputting an audio signal. For example, the audio component 1610 may include a microphone (MIC). When the electronic equipment 1600 is in an operation mode such as a call mode, a recording mode, and a voice recognition mode, the MIC may be adapted to receiving an external audio signal. The received audio signal may be further stored in the memory 1604 or may be sent via the communication component 1616. The audio component 1610 may further include a loudspeaker adapted to outputting the audio signal.

The I/O interface 1612 may provide an interface between the processing component 1602 and a peripheral interface module. Such a peripheral interface module may be a keypad, a click wheel, a button, and/or the like. Such a button may include but is not limited to: a homepage button, a volume button, a start button, and a lock button.

The sensor component 1614 may include one or more sensors for assessing various states of the electronic equipment 1600. For example, the sensor component 1614 may detect an on/off state of the electronic equipment 1600 and relative positioning of components such as the display and the keypad of the electronic equipment 1600. The sensor component 1614 may further detect a change in the position of the electronic equipment 1600 or of a component of the electronic equipment, whether there is contact between the electronic equipment 1600 and a target object, the orientation or acceleration/deceleration of the electronic equipment 1600, a change in the temperature of the electronic equipment 1600. The sensor component 1614 may include a proximity sensor adapted to detecting existence of a nearby object without physical contact. The sensor component 1614 may further include an optical sensor such as a Complementary Metal-Oxide-Semiconductor (CMOS) or a Charge-Coupled-Device (CCD) image sensor used in an imaging application. The sensor component 1614 may further include an acceleration sensor, a gyroscope sensor, a magnetic sensor, a distance sensor, a pressure sensor, or a temperature sensor.

The communication component 1616 may be adapted to facilitating wired or wireless communication between the electronic equipment 1600 and other equipment. The electronic equipment 1600 may access a wireless network based on a communication standard such as Wi-Fi, 2G, 3G, 4G, 5G network or combination thereof. The communication component 1616 may broadcast related information or receive a broadcast signal from an external broadcast management system via a broadcast channel. The communication component 1616 may further include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The electronic equipment 1600 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In some embodiments of the disclosure, a non-transitory computer-readable storage medium including instructions, such as memory 1604 including instructions, may be provided. The instructions may be executed by the processor 1620 of the electronic equipment 1600, to implement the method. The computer-readable storage medium may be Read-Only Memory (ROM), Compact Disc Read-Only Memory (CD-ROM), a magnetic tape, a floppy disk, optical data storage equipment, and/or the like.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure. Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Herein by "multiple," it may mean two or more. A term "and/or" may describe an association between associated objects, including three possible relationships. For example, by A and/or B, it may mean that there may be three cases, namely, existence of but A, existence of both A and B, or existence of but B. A slash mark "/" may generally denote an "or" relationship between two associated objects that come respectively before and after the mark per se.

Other embodiments of the present disclosure will be apparent to one skilled in the art after he/she has considered the subject disclosure and practiced the invention disclosed herein. The subject application is intended to cover any variation, use, or adaptation of the subject disclosure following the general principle of the subject disclosure and including such departures from the subject disclosure as come within known or customary practice in the art. The subject disclosure and its embodiments are intended to be exemplary only, with a true scope of the subject disclosure being indicated by the appended claims.

The invention claimed is:

1. Electronic equipment, comprising a center frame, a first motor, a second motor, and a drive module,
   wherein the first motor and the second motor are fixed respectively at a first designated location and a second designated location of the center frame,
   wherein the drive module is electrically coupled respectively to the first motor and the second motor,
   wherein the drive module is adapted to: drive, according to a control signal, the first motor or the second motor to vibrate independently, or drive the first motor and the second motor to vibrate synchronously,
   wherein the electronic equipment further comprises a motherboard,
   wherein two sets of elastic pieces are arranged on the motherboard,
   wherein the first motor is provided with a power end in elastic contact with a first set of the two sets of elastic pieces, and
   wherein the second motor is provided with a power end in elastic contact with a second of the two sets of elastic pieces.

2. The electronic equipment of claim 1, wherein the center frame, a housing of the first motor, and a housing of the second motor are formed as one integral piece.

3. The electronic equipment of claim 1, wherein the first motor and the second motor are linear motors adapted to vibrating in one direction.

4. The electronic equipment of claim 1, wherein the drive module comprises a first drive chip and a second drive chip, wherein the first drive chip is adapted to driving the first motor,
   wherein the second drive chip is adapted to driving the second motor,
   wherein both the first drive chip and the second drive chip use a clock signal provided by one clock source.

5. The electronic equipment of claim 4, wherein a phase lock loop is arranged in each of the first drive chip and the second drive chip, wherein the phase lock loop is adapted to locking a phase of the clock signal.

6. The electronic equipment of claim 1, further comprising a touch button,
   wherein a preset pattern is pre-stored in the drive module,
   wherein the drive module is connected to the touch button,
   wherein the drive module is adapted to, in response to a touch operation on the touch button, controlling, according to the preset pattern, the first motor and the second motor to vibrate synchronously.

7. The electronic equipment of claim 1, wherein a boost circuit is arranged in the drive module,
   wherein the boost circuit is adapted to boosting an input voltage to acquire a drive voltage greater than a set voltage threshold,
   wherein the drive voltage is adapted to driving at least one of the first motor or the second motor to vibrate with amplitude greater than a set amplitude threshold.

8. The electronic equipment of claim 1, further comprising a processor, wherein the processor is adapted to acquiring an input voltage of the first motor and an input voltage of the second motor respectively, and generating the control signal according to the input voltage of the first motor and the input voltage of the second motor,
   wherein the control signal is adapted to allowing the drive module to regulate an output voltage to lower respective amplitudes with which the first motor and the second motor vibrate.

9. The electronic equipment of claim 8, further comprising a magnetic field detector module,
   wherein the magnetic field detector module is adapted to detecting an alternating magnetic field generated by the first motor to acquire a first set of voltages, and detecting an alternating magnetic field generated by the second motor to acquire a second set of voltages,
   wherein the processor is connected to the magnetic field detector module, wherein the processor is adapted to, in response to detecting an operation triggering a vibrational prompt, acquiring a first resonant frequency of the first motor for the moment according to the first set of voltages, acquiring a second resonant frequency of the second motor for the moment according to the second set of voltages, and sending the first resonant frequency and the second resonant frequency to the drive module,
   wherein the drive module is adapted to driving, respectively according to the first resonant frequency and the second resonant frequency, the first motor and the second motor to vibrate synchronously to implement the vibrational prompt.

10. The electronic equipment of claim 8, further comprising an audio module,
    wherein the audio module is adapted to acquiring an envelope signal of audio data and sending the envelope signal to the processor,
    wherein the processor is adapted to generating a drive signal according to the envelope signal, and sending the drive signal to the drive module, wherein the drive module is adapted to controlling, according to the drive signal, at least one of the first motor or the second motor to vibrate with the audio data.

11. A mobile terminal comprising the electronic equipment of claim 1, further comprising a display screen, wherein the first and second motors are controlled to vibrate synchronously to translate the entire mobile terminal in a three dimension, thereby avoiding occurrence of a balance point, thus increasing amplitude of vibration, and improving effectiveness of a vibrational prompt upon a user.

12. A method for controlling a motor in electronic equipment, comprising: acquiring a first set of voltages and a second set of voltages by acquiring detected voltages output by a magnetic field detector module by detection on a first motor and a second motor within a preset period of time;
in response to detecting an operation triggering a vibrational prompt, acquiring a first resonant frequency of the first motor for the moment according to the first set of voltages, and acquiring a second resonant frequency of the second motor for the moment according to the second set of voltages; and
sending the first resonant frequency and the second resonant frequency to a drive module, such that the drive module drives, respectively according to the first resonant frequency and the second resonant frequency, the first motor and the second motor to vibrate synchronously to implement the vibrational prompt.

13. The method of claim 12, comprising:
acquiring an input voltage of the first motor and an input voltage of the second motor respectively;
acquiring trends of changes in the input voltage of the first motor and the input voltage of the second motor respectively;
acquiring a result of comparison by comparing the trends of changes in the input voltage of the first motor and the input voltage of the second motor; and
generating a control signal according to the result of comparison, and sending the control signal to the drive module, such that the drive module drives, according to the control signal, the first motor and the second motor to keep vibrating synchronously.

14. The method of claim 12, further comprising:
acquiring an envelope signal of audio data from an audio module in the electronic equipment;
generating a drive signal according to the envelope signal; and
sending the drive signal to the drive module, such that the drive module drives, according to the drive signal, at least one of the first motor or the second motor to vibrate with the audio data.

15. A non-transitory computer-readable storage medium having stored thereon instructions for execution by a processor to implement the method for controlling a motor in electronic equipment according to claim 12.

16. The non-transitory computer-readable storage medium of claim 15, wherein the method comprises:
acquiring an input voltage of the first motor and an input voltage of the second motor respectively;
acquiring trends of changes in the input voltage of the first motor and the input voltage of the second motor respectively;
acquiring a result of comparison by comparing the trends of changes in the input voltage of the first motor and the input voltage of the second motor;
generating a control signal according to the result of comparison, and sending the control signal to a drive module, such that the drive module drives, according to the control signal, the first motor and the second motor to keep vibrating synchronously;
acquiring an envelope signal of audio data from an audio module in the electronic equipment;
generating a drive signal according to the envelope signal; and
sending the drive signal to the drive module, such that the drive module drives, according to the drive signal, at least one of the first motor or the second motor to vibrate with the audio data.

17. A device for controlling a motor in electronic equipment, comprising a processor and memory,
wherein the memory is adapted to storing an instruction executable by the processor,
wherein the processor is adapted to:
acquire a first set of voltages and a second set of voltages by acquiring detected voltages output by a magnetic field detector module by detection on a first motor and a second motor within a preset period of time;
in response to detecting an operation triggering a vibrational prompt, acquire a first resonant frequency of the first motor for the moment according to the first set of voltages, and acquire a second resonant frequency of the second motor for the moment according to the second set of voltages; and
send the first resonant frequency and the second resonant frequency to a drive module, such that the drive module drives, respectively according to the first resonant frequency and the second resonant frequency, the first motor and the second motor to vibrate synchronously to implement the vibrational prompt.

18. The device of claim 17, wherein the processor is adapted to:
acquire an input voltage of the first motor and an input voltage of the second motor respectively;
acquire trends of changes in the input voltage of the first motor and the input voltage of the second motor respectively;
acquire a result of comparison by comparing the trends of changes in the input voltage of the first motor and the input voltage of the second motor; and
generate a control signal according to the result of comparison, and sending the control signal to the drive module, such that the drive module drives, according to the control signal, the first motor and the second motor to keep vibrating synchronously.

19. The device of claim 17, wherein the processor is adapted to:
acquire an envelope signal of audio data from an audio module in the electronic equipment;
generate a drive signal according to the envelope signal; and
send the drive signal to the drive module, such that the drive module drives, according to the drive signal, at least one of the first motor or the second motor to vibrate with the audio data.

* * * * *